Dec. 17, 1968 F. ULRICH 3,417,376

SCANNING AND SELECTING SYSTEMS

Filed Oct. 15, 1965 7 Sheets-Sheet 1

Dec. 17, 1968 F. ULRICH 3,417,376

SCANNING AND SELECTING SYSTEMS

Filed Oct. 15, 1965 7 Sheets-Sheet 2

Dec. 17, 1968 F. ULRICH 3,417,376

SCANNING AND SELECTING SYSTEMS

Filed Oct. 15, 1965 7 Sheets-Sheet 7

United States Patent Office 3,417,376

Patented Dec. 17, 1968

3,417,376
SCANNING AND SELECTING SYSTEMS

Friedrich Ulrich, Stuttgart-Weilimdorf, Germany, assignor to International Standard Electric Corporation Filed Oct. 15, 1965, Ser. No. 496,276
Claims priority, application Germany, Oct. 23, 1964, St 22,848; Oct. 31, 1964, St 22,884
9 Claims. (Cl. 340—172.5)

ABSTRACT OF THE DISCLOSURE

Scanning and selecting systems using a minimum of decoupling elements and central storage units. Magnetic blocking techniques are employed to perform the selection by blocking elements not marked. The arrangement automatically investigates in sequence only marked information sources.

The invention relates to digital scanning arrangement and particularily to scanning and selecting systems for sequential investigation of a plurality of marked information sources out of a large number of such sources in data processing and telephone exchange systems.

At different points within data processing, particularly in the exchange engineering, the scanning of a plurality of information sources, such as lines, are required to determine which of said lines are marked. There are many so-called linear scanning methods known in which all information sources are scanned successively. They require $n$ steps, to find all markings if $n$ information sources exist. But frequently, such as in the telephone engineering, only a relatively small portion of the information sources bears a marking. In such cases the number of steps per marking is relatively high within such linear scanning methods.

When applying the known selecting circuits for scanning to sequentially investigate all marked information sources out of a large number of such sources, an individual storage could be provided per information source to denote the information sources that have already been interrogated and found marked. It would be possible then to investigate all marked information sources in succeeding selecting processes. The expenditure in individual storage, however, would be very high.

It is an object of the invention to provide selecting and scanning systems using a minimum of decoupling elements without complicated wiring and only a few central storages which are, moreover, used to control the selecting processes.

In the scanning arrangement according to the invention coded, preferably, binary-coded words are associated to the input information items. The input leads are then interrogated in an advancing narrowing of markings in the code-digit-like manner. According to this arrangement, a proposed selecting circuit operates with magnetic elements through which the electric input leads are threaded in a coded distribution.

Starting from such a selecting circuit the inventive scanning can be carried out in several processes.

In a first process the marked information source with the lowest code word is identified according to a selecting arrangement described herein. The invention can easily be modified thus that one starts with the highest code word. In the inventive narrowing code-digit-like selecting process all information items to which a code signal (preferably the binary signal or digit) has been associated are inhibited at interrogation. All those information sources are excluded from being selected due to the preceding interrogation. At the end of the selecting process all information items are inhibited except the one having been selected and marked. The code word of the investigate information source can be read from the position of the central storages which control and peruse the scanning process.

During a second process according to the invention the higher valenced code-digits (e.g. at the binary code 1 instead of 0) on one or several marked information sources are investigated at the individual code-digits in the reversed sequence to the first process viz. starting at the lowest valenced code digit. The same code values (e.g. code value 1, if the code value 0 has been selected) are inhibited during said second process wherein the higher valued residual code-digits have not yet been considered, like at the end of the first scanning process. If during the interrogation of the higher valenced code-digits no marked information sources are investigated the code words of which do not commence with the non-inhibited code-digits at the higher valenced residual code-points and with the interrogated code-digit at the just interrogated code-point, the just interrogated code point and the lower valenced code-points are not considered during the next following interrogations. In the succeeding scanning step the inhibition is cancelled in the next following higher valenced code-digit and the code-digit next higher in valence is interrogated in connection with the remaining inhibition of the higher valenced residual code-digits.

This second process is continued only until one or several marked information sources are found wherein the code words commence with the interrogated code-digit combination. Thereupon the second process is interrupted and a third process started which is analogous to the first selecting process. Under the maintained inhibition of the higher valenced residual code digits the information sources are scanned on a marking, digit by digit, and at the end of said third process the second marked information source is investigated with the next higher associated code word. The code word of the second marked information source can again be read from the position of the central storage.

In the aforedescribed manner the scanning process continues such that a scanning process analogous to the described second process and one analogous to the described third process alternate, until all marked information sources are investigated.

The scanning method according to the invention will now further be explained with the aid of the accompanying drawings, wherein.

Figure 1:
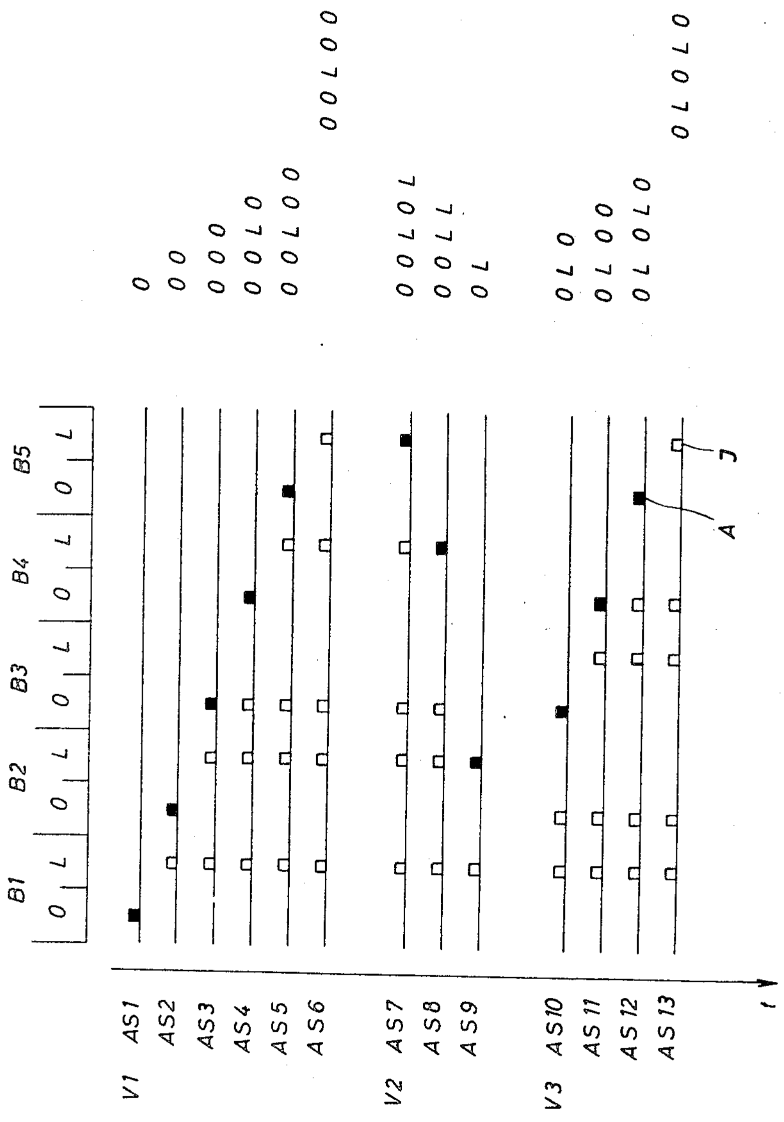
FIG. 1 shows graphically the course of scanning with binary-coded code words.

The code words in the example according to FIG. 1 have five binary digits B1 to B5. Those information sources are assumed as marked in the example, having the code words 00L00, 0L0L0, and L000L. According to one arrangement during the first process V1 including scanning steps AS1 to AS6, the information source having the lowest code word (00L00) is investigated. FIG. 1 shows how by code-digit-like interrogation A narrows the choices, and that the inhibition J of the non-selected information sources is performed on the already investigated code-digits.

After the sixth scanning step the second process V2 commences in the scanning arrangement of the invention. At the first scanning step AS7 in the second process V2 the next higher valanced code-digit 1 is scanned in the final code-digit B5 on a marked information source. The same information sources are inhibited in the remaining binary digits as during the scanning step AS6. Since no marking exists, the code-digit 1 hitherto inhibited is now interrogated on a marking during the next scanning step AS8 at the next following higher binary digit B4, in conjunction with the inhibition of the remaining code-digits B1 to B3 of the previously scanned code word. The binary digit B5 was already interrogated. Since also during the scanning step AS8 no marked information source was found the associated code word of which commences with the binary signal 0011 the next following code-digit in a higher valanced code-digit is interrogated. Since in the binary point B3 the binary digit 1 has already been investigated, the following scanning step AS9 can now investigate the code words with the binary digit 1 at the binary point B2. Inhibition in the remaining code-point B1 is maintained. The code-points B4 and B5 already investigated during the second process and the code-point B3, left over, remain without consideration.

Since process V2 found out that at least one marked information source exists, the code word of which commences with the binary signal 0L, the process V2 is interrupted.

Maintaining the inhibition at the residual code-points, in the example, only point B1, another selecting process V3 is started analogous to the first process V1. The information sources are scanned in the steps AS10 to AS13 code-digit by code-digit, till the information source with the next higher valenced code word 0L0L0 is investigated. Thereupon a process analogous to the process V2 would follow. This type of scanning successively investigates all marked information sources.

Figure 2A:
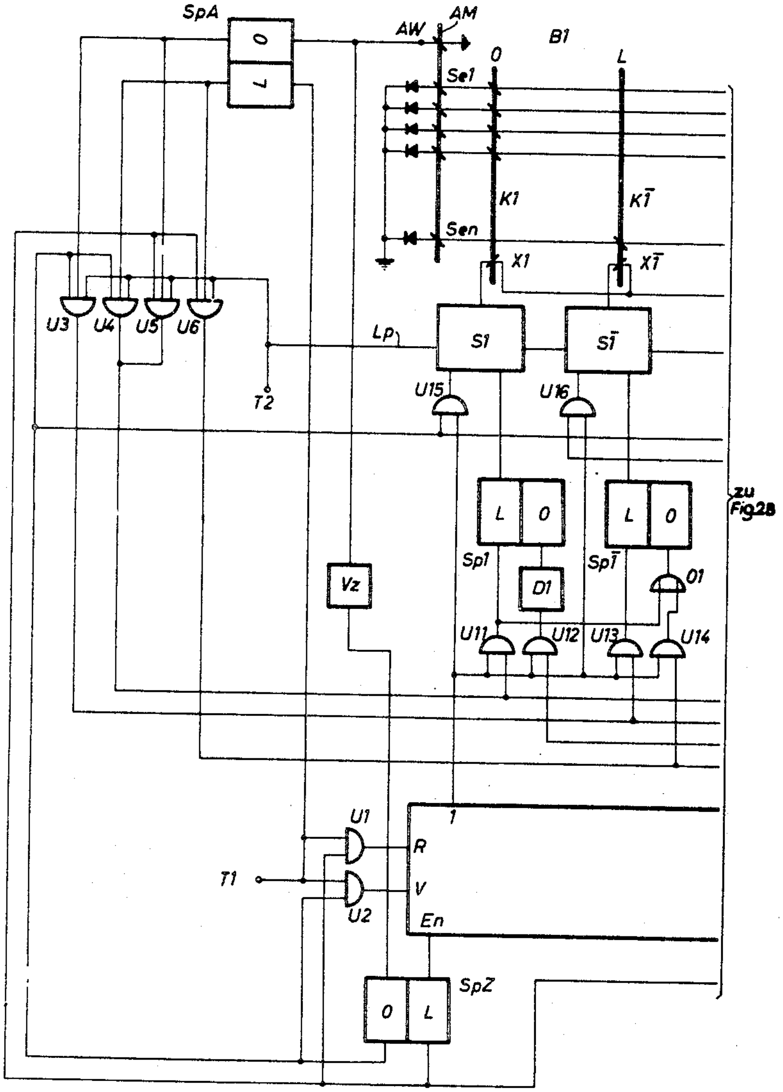
FIG. 2A and FIG. 2B shows a circuit arrangement to carry out the method according to the invention.
Figure 2B:
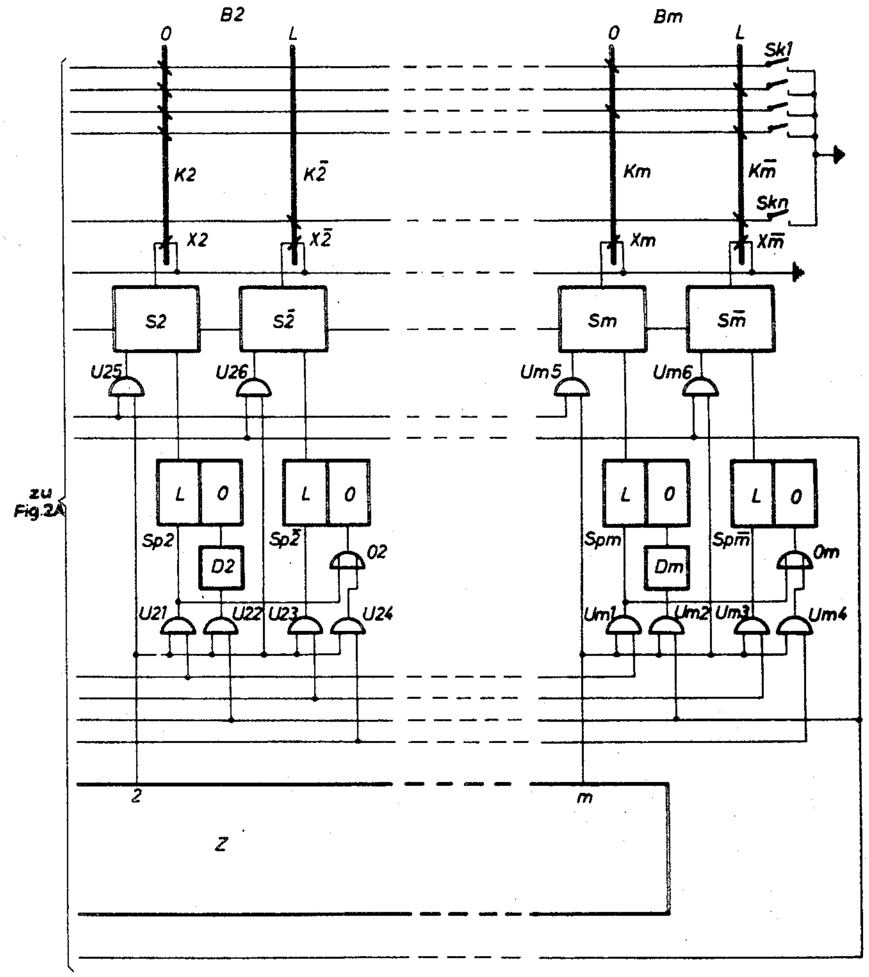

FIG. 2 shows the circuit arrangement to carry out the scanning method according to the invention. Binary-coded words with the binary digits B1 to B*m* are assumed as an example. In the magnetic access circuit shown in FIG. 2, the information sources, the electric input leads S*e*1 to S*en* are threaded through magnetic elements in a binary-coded distribution and contradictorily connected to the scanning device.

An information source is marked, if the pertinent switch SK1 to SK*n* is closed.

Figure 3:
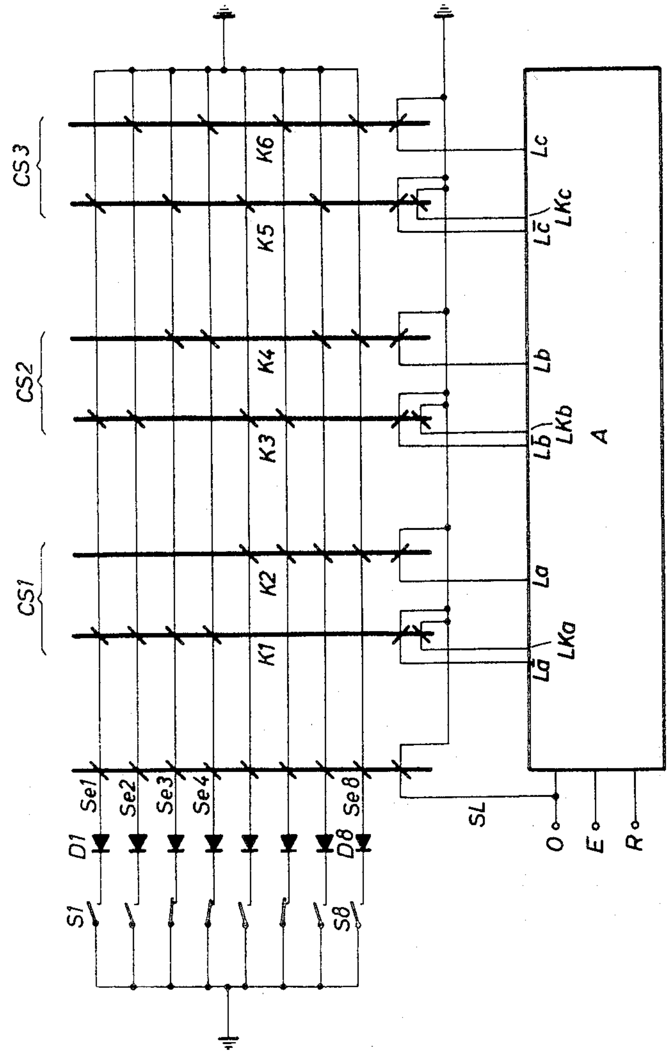
FIG. 3 shows an alternative selecting circuit arrangement, using binary-coded code words.

To evaluate the code digit by digit scannings, an interrogating winding AW is looped into a magnetic evaluating element AM. The magnetic evaluating element AM comprises all electric input leads S*e*1 to S*en*. On the interrogating winding AW a positive signal occurs, if a positive impulse is given onto a magnetic element K1, $\overline{K1}$ to K*m*, $\overline{Km}$ through which element a marked input lead is looped. Through a negative impulse on one of the magnetic elements K1, $\overline{K1}$ to K*m*, $\overline{Km}$ all marked and not marked input leads S*e*1 to S*en* are inhibited which are threaded through said magnetic element or through blocking windings as shown in FIG. 3, for example. Such inhibited input leads produce no output signal at the interrogating winding AW, if at another code-digit a magnetic element including the input lead is actuated positively.

The storages S*p*1, $\overline{Sp1}$ to S*pm*, $\overline{Spm}$ of FIG. 2 are standard-type flip-flop storages with internally crossed outputs. After the input of one side has received a positive impulse the marked output of that side bears a positive potential; repeated pulses on the same input cause no further changes.

The counter Z can be advanced or reversed with positive pulses applied to the input V or to the input R respectively. By another application in the forward direction, after having reached its final position, whereby the final output lead SM remains marked, a positive signal appears at the output E*n* of the counter Z.

Figure 7:
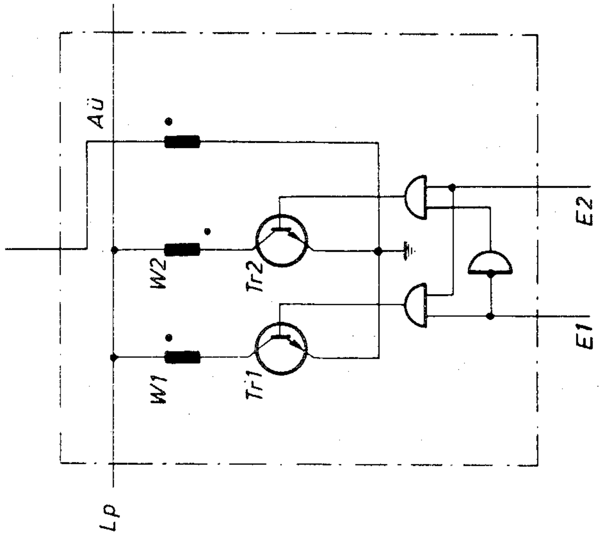
FIG. 7 shows a switch, having such a transverse line above the cipher.
Figure 6:
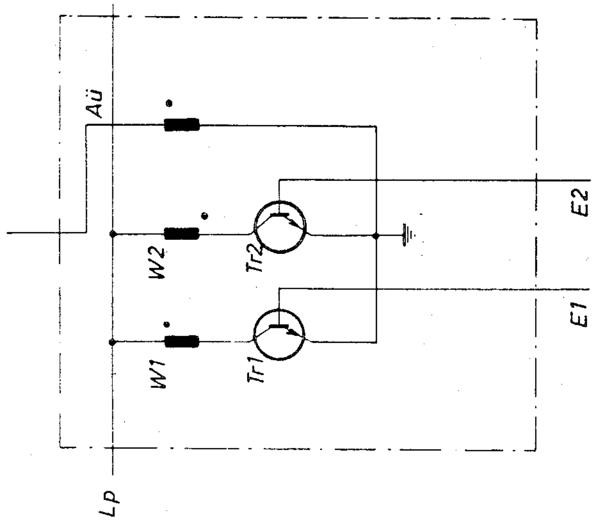
FIG. 6 shows one of the switches, having no transverse line above the cipher.

The through-connecting switches S1, $\overline{S1}$ to S*m*, $\overline{Sm}$ conduct positive pulses, applied to the input T2 and, consequently, to the line L*p*, depending on whether they are applied as positive or negative pulses to the output leads X1, $\overline{X1}$ to X*m*, $\overline{Xm}$. The switches S1, S2 to S*m*, having no transverse line above the cipher, are designed as shown in FIG. 6, the other switches $\overline{S1}$, $\overline{S2}$ to $\overline{Sm}$ are designed as shown in FIG. 7.

The following paragraphs describe the function of the circuit arrangement in connection with the drawing, FIG. 2.

It is assumed that all storages S*p*1, $\overline{Sp1}$ to S*pm*, $\overline{Spm}$ are in zero position originally. This means that the outputs connected to the ends marked with 0 shows a positive potential, the other a negative potential. (This terminology also applies for the storages S*p*A and S*p*Z.) It is further assumed that the storage S*p*Z is in 0-condition and the storage S*p*A in the 1-condition whereby the input T1 is connected with the forward input V of the counter Z. The AND-condition of the AND-circuit U2 is met. The first output of the counter Z, leading to the switch S1, is assumed to be marked. A succeeding positive impulse, applied to the input T2, passes through (AND-circuit U15 is conductive) to the output X1 via the switch S1. If an output signal appears at the interrogating winding AW the storage S*p*A is brought into 0-condition. If no output signal appears said storage remains in the 1-condition. In the first case, the AND-circuit U3 becomes effective during the impulse, the AND-circuit U13 becomes effective through the output of said AND-circuit U3 and through the first marked output lead of the counter Z, consequently, the storage $\overline{Sp1}$ is brought into the 1-condition. In the latter case (no impulse applied to the interrogating winding AW) the AND-circuit U4 through the output of which and, through the first marked output lead of the counter Z, the AND-circuit U11 become effective and the storage S*p*1 is brought into the L-condition.

During the following cycle the counter Z is advanced by one position or digit by a positive pulse, applied to the input T1, and a probable 0-marking of the storage S*p*A is cancelled simultaneously.

During the following cycle a positive pulse is applied to the input T2. Said pulse passes through to the output X2 via the switch S2. (The AND-circuit U25 is conductive.) At the same time, a negative inhibition impulse appears on the output X1 or $\overline{X1}$, corresponding to the preceding scanning result. Said inhibition impulse is controlled by the storage S*p*1 or $\overline{Sp1}$, respectively, being in the 1-condition. During the second interrogation one of the AND circuits U21, U23 becomes effective, depending on the existence or the non-existence of an output signal at the interrogating winding AW, due to the marking on the second output lead of the counter Z, which AND-circuit causes the L-condition for the storage S*p*2 or $\overline{Sp2}$, and so forth.

In this way all code signals not having been selected during the interrogation of preceding code-digits, are inhibited at the succeeding code-digits and, consequently, the input leads threaded through said code-digits.

After in the final position of the counter, the marked information source with the lowest code word has been investigated, a positive signal appears at the output E*n* of the counter Z during the following impulse applied to the input T1. This signal is used, in order to transmit the code word of the investigated information source from the storage conditions. The circuitries thereto required are known to the art and are, consequently, not described any more or shown on the drawing.

Figure 4:
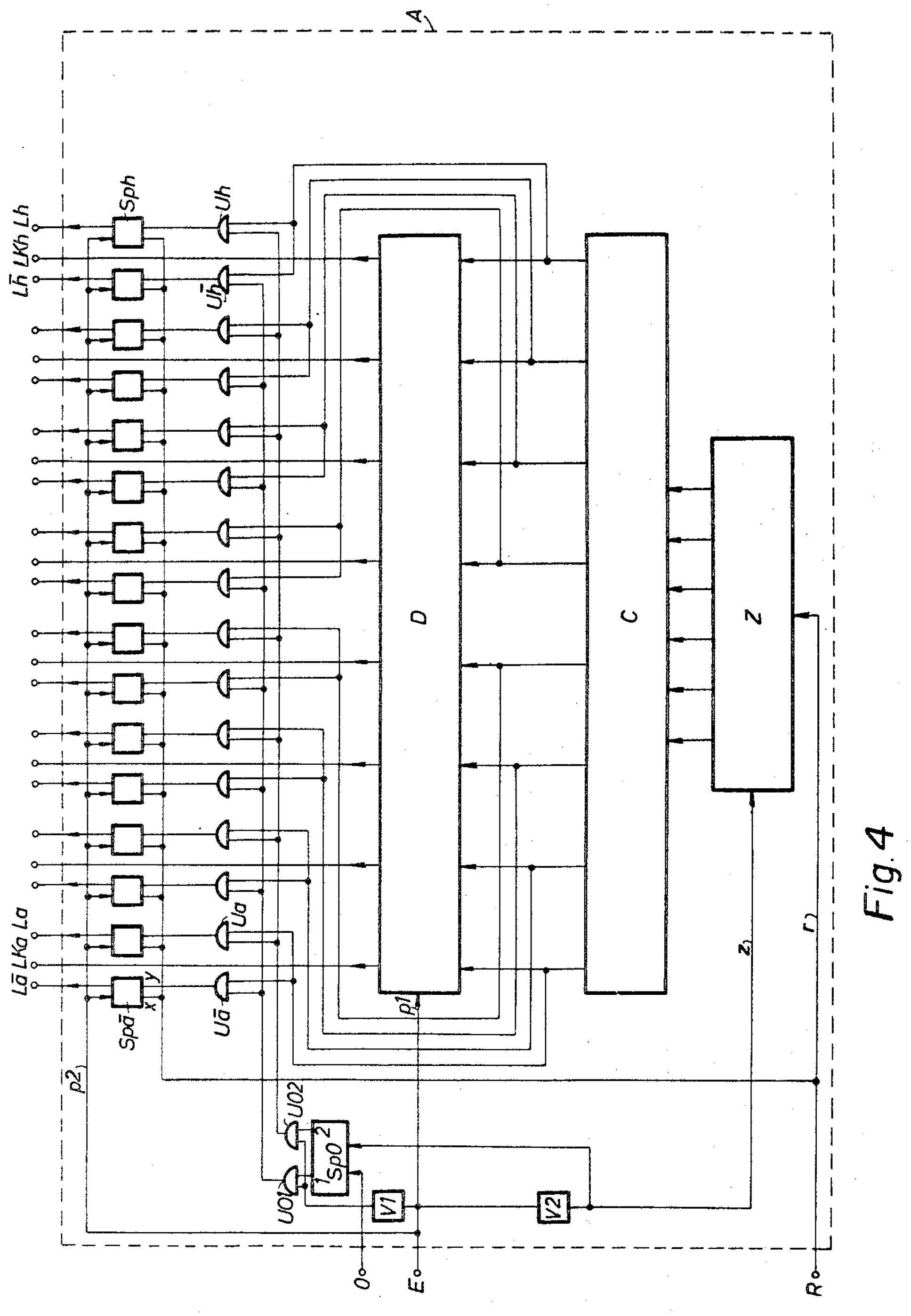
FIG. 4 shows an example of a design of the evaluating-circuit, shown in FIG. 3, symbolically as a block only.
Figure 5:
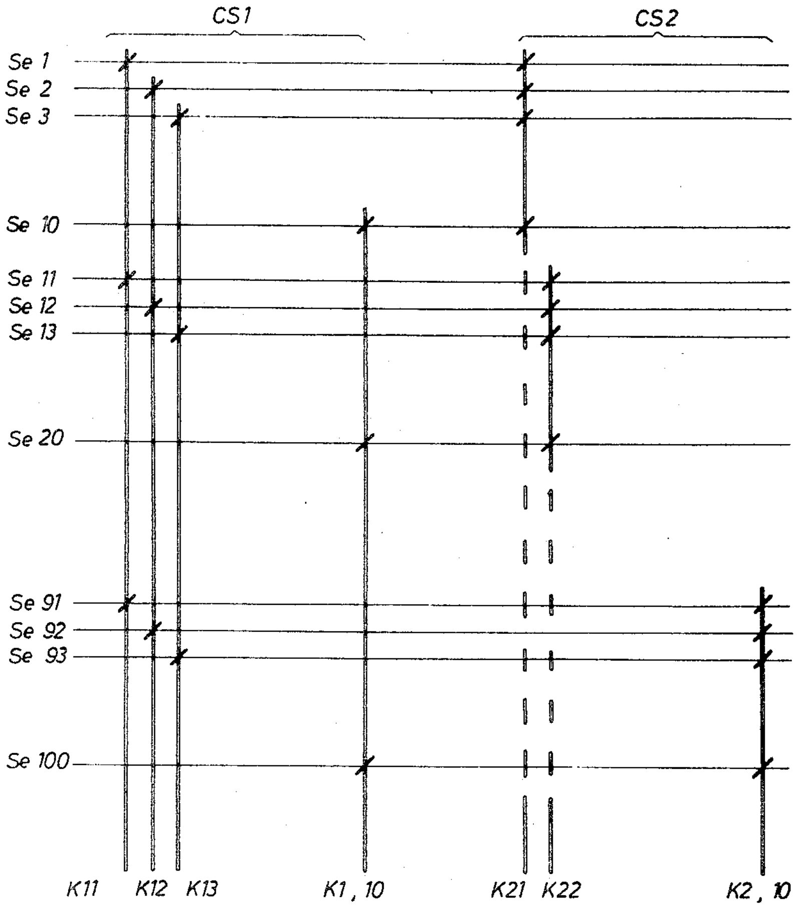
FIG. 5 shows threading of the input loops when using code words in the 1-out-of-10 code.

An alternate selecting arrangement is shown in FIGS. 3, 4 and 5. FIG. 3 shows an arrangement wherein only eight input loops are to be considered. Therefore, according to the equation $n=\log_2 N$, where $n$ is the number of binary digits per code word and N equal the number of possible markings, code words with three binary digits are required. The electric inputs loops Se1 to Se8 are led through the magnetic cores K1 to K6 in a binary-coded distribution, whereby the magnetic cores K1 and K2, K3 and K4, K5 and K6 are looped in contradictory pairs and each pair corresponds to a binary digit. The cores K1, K3, and K5 have interrogating windings LK*a*, LK*b*, and LK*c* and blocking windings $L\bar{a}$, $L\bar{b}$, and $L\bar{c}$. The cores K2, K4, and K6 are only equipped with blocking windings L*a*, L*b*, and L*c*. The control core KS, analogous to cores KS of FIG. 2 includes all eight input loops and a reading winding SL similar to winding AW of FIG. 2. Closing of one of the switches S1 to S8 similar to switches SK1–SK7 of FIG. 2, means that the associated, non-linear electric loop Se1 to Se8 is marked, including the pertinent diode D1 to D8.

The design of the evaluating-circuit A is explained together with the explanation of FIG. 4. The evaluating circuit A performs the following functions:

The evaluating-circuit is brought into the starting position or original position by an impulse on the restoring line R. A positive impulse appears successively on each of the outputs LK*a*, LK*b*, and LK*c* through impulses applied to the input E. The outputs LK*a* . . . LK*c* are inserted in the magnetic crosspoint elements, K1, K3, and K5 in such a way that, via said electric loops S*e*, control pulses are induced which try to actuate the associated diodes in the conductive direction, so that when the aligned switch S is closed, a current flows through said diodes. If, in one or several of the electric loops S*e* a current flows, an impulse is induced upon the reading loop SL via the magnetic loop KS, which pulse is led to the scanning facility via the line O. The blocking windings $L\bar{a}$, L*a* . . . $L\bar{c}$, L*c* are actuated through storages, provided in the scanning facility. They also furnish positive pulses which influence, the magnetic flux in another direction to thereby induce inhibition pulses upon the electric loops. A control and one or several inhibition pulses on an electric loop cancel each other mutually or control the associated diode in the non-conductive or blocking direction so that no current flows through said diode, even if the switch is closed.

If, for example, an impulse on the interrogating winding LK*a* furnishes a signal via the reading loop SL, an impulse is given via the blocking winding L*a* simultaneously, when the interrogating winding LK*b* and then the interrogating winding LK*c* are actuated at the following pulses. If no signal arrives via the reading loop SL when the loop LK*a* is interrogated an impulse is given on the blocking winding $L\bar{a}$ simultaneously to the following pulses on the windings LK*b*, LK*c*.

The switches S3, S4, and S6 are closed for example. Through an impulse, applied to the input R, the evaluating circuit is brought into the original or starting position. At the following first impulse on the input E the impulse appears on the interrogating winding LK*a*, control pulses are induced upon the electric loops Se1 to Se4. Current flows through the loops Se3 and Se4, the input 0 receives a signal via the control core KS and its reading loop SL.

At the second impulse on the input E pulses appear on the interrogating winding LK*b* and on the blocking winding L*a*. Therefrom result control pulses on the electric loops Se1 and Se2 (the interrogating pulses on the loops Se5 and Se6 are compensated by the blocking pulses arriving from the core K2). The switches S1, S2, associated to the leads with control signals, are open, no current flows, no signal is led to the input 0 via the reading loop SL.

At the third impulse applied to the input E an impulse appears on the interrogating winding LK*c* and blocking pulses appear on the winding L*a* and $L\bar{b}$. As a result a control pulse appears on the electric loop Se3, (the control pulses on the loop Se1, Se5, and Se7 are compensated by blocking pulses, or even overcompensated). Current flows through the loop Se3 and the input 0 receives a signal via the reading loop SL.

At the following impulse, applied to the input E, output pulses occur at the outputs L*a*, $L\bar{b}$, L*c* of the evaluating circuit A. The selecting process is completed. If the complement of the meaning of the output pulses is formed, the configuration 010 is obtained. This corresponds to the code word of the loop Se3 which possesses the lowest number of the loops Se3, Se4, and Se6 offered.

By suitable tappings at the outputs L*a*, $L\bar{a}$ . . . $L\bar{c}$, L*c*, after selection has been completed, the number of the selected loop is obtained in a simple manner.

FIG. 4 shows an example evaluating-circuit A in detail. The evaluating-circuit is shown having eight binary digits, thus permitting to scan 256 loops.

The block Z represents a three-stage binary counter which is brought into zero position via the line *r*. The counter is advanced via the line *z*.

The outputs of the counter Z are led to the code converter C which converts the binary code into an 1-out-of-8 code. The outputs of the code converter form the control inputs of the through-connecting facility D which is designed thus that an impulse applied to its input *p*1 is advanced to the output, associated to the actuated input.

The outputs of the code converter C are moreover led to an input of the AND-circuits $U\bar{a}$, U*a* . . . $U\bar{h}$, U*h* each, the outputs of said AND-circuits are again led to the inputs *y* of the storage circuits S*pa*, $Sp\bar{a}$ . . . S*ph*, $Sp\bar{h}$. Said storage circuits are designed thus that, after having been actuated through the input *y* they forward an impulse from the input *p*2 to the outputs. Said storage circuits can be restored via the concentrated inputs *x*. Said concentration is connected with the line *r* and the external restoring line R through which the entire arrangement can be restored into the original or starting position.

It is assumed that the line E receives an impulse, starting from the original position. Said impulse is now advanced to the output LK*a*. If a signal reaches the input 0 via the connected magnetic circuit the output 2 of the trigger circuit Sp0 is marked. If no signal reaches the input 0 the output 1 remains marked. Some time after the impulse has reached input E, a signal is led, delayed by the delay circuit V1, to each input of both AND-circuits U01, U02, connected to the outputs 1 and 2 of the trigger circuit Sp0. If a signal has been applied to the input 0 of the condition of the AND circuit, aligned to the output 2 and, consequently, also the condition for the AND-circuit U*a* is met and the storage S*pa* is set. If no signal arrived at the input 0 the storage $Sp\bar{a}$ is set in an analogous manner. After some more time has elapsed following the impulse applied to the input E the counter Z is advanced to the next following counter position, delayed by the delay circuit V2.

At the following impulse, applied to the input E, an impulse appears at the output LK*b*, and, depending of the previous result, at the output $L\bar{a}$ or L*a*, and so forth.

FIG. 5 shows threading of the input loops Se1 to Se100 when using code words in the 1-out-of-10 code. Two code-digits CS1, CS2 are required, in each code-digit or coding point ten magnetic elements (e.g. K11 to K1, 10) are threaded, which elements are interrogated successively.

After selection by either alternative the circuit arrangement is switched to the second process in the scanning method according to the invention. The signal at the output E*n* of the counter Z switches the storage S*p*Z into the 1-condition. Thereby the AND-circuit U1 becomes effective and further pulses applied to the input T1 effect that the counter Z counts backward. At the same time, the AND-circuits U3 and U4 cannot become effective any more in this phase, but the AND-circuits U5 and U6 become effective. Also the AND-circuits U15, U25 to Um5 cannot become effective any more, but the AND-circuits U16, U26 to Um6, which means that a storage $Sp\overline{1}$, $Sp\overline{2}$ to $Sp\overline{m}$, being in the L-condition, forwards a positive impulse (previously negative to the outputs $X\overline{1}$, $X\overline{2}$ to $X\overline{m}$, when the associated output lead of the counter Z is marked.

Furthermore, the storages Sp1, Sp2 to Spm are brought into the 0-condition via the differentiating elements D1, D2 to Dm and via the associated AND-circuits U12, U22 and Um2, whereby the associated counter output is marked and which storages have been in the L-condition, resulting from the first scanning process.

The storage Spm is brought into the 0-condition immediately due to the switching-over of the storage SpZ.

The circuit arrangement can be actuated directly and periodically across all scanning processes through alternating pulses, applied to the inputs T1 and T2, there exist no limits. After the counter Z has reached its final position through the impulse, applied to the input T1 a positive impulse is applied to the input T2. If the storage Spm was in the 0-condition, the storage $Sp\overline{m}$ in the L-condition, a positive impulse reaches the output $X\overline{m}$. If on the other hand, after the latest scanning step during the first scanning process, the storage Spm was in the L-condition, the storage $Sp\overline{m}$ in the 0 condition, the storage Spm has been put, as already described, into the 0-condition via the differentiating element Dm. If the control impulse is applied to the input T2 no impulse is in such a case applied to any of the outputs Xm, $X\overline{m}$, the final code-digit remains unconsidered during further scanning steps in the second scanning process. The same applies duing the interrogation of the higher valenced code-digits. If, at the interrogation of a code-digit Bi, neither the outputs Xi nor the output $X\overline{i}$ receives an interrogating impulse, it is the same as if the code-digit has been omitted; at the following interrogation the counter Z has already marked the code-digit, following next in value.

If a signal appears at the interrogating winding AW when the output $X\overline{m}$ is interrogated, the AND-circuit U5 becomes effective and, via the AND-circuit U1m, the storage Spm is brought into the L-condition. At the same time the storage $Sp\overline{m}$ is restored via the OR-circuit Om.

If no signal appears at the interrogating winding AW, the AND-circuit U6 becomes effective and the storage $Sp\overline{m}$ is also put into the 0-condition via the AND circuit Um4 and the OR-circuit Om.

Delayed somewhat by a delay circuit Vz the storage SpZ is also brought into the 0-condition again, if an output signal prevails at the interrogating winding AW, and, consequently, the counting direction of the counter Z is again reversed to count forward.

If no signal appears at the interrogating winding AW the counter Z is set backward by one digit at the next impulse applied to the input T1, and at the succeeding impulse, applied to the input T2 the above described processes are repeated, but now referring to the outputs Xm–1, $X\overline{m-1}$ in the code-digit Bm–1, following next in value, and thereupon referring to the code-digit, marked by the counter Z. The code-digits, located on the right side, are thereby not actuated any more, the remaining code-digits on the left side are further inhibited, corresponding to the preceding interrogations.

If a signal appears at the interrogating winding AW when a code-digit is interrogated, the counting direction of the counter Z is reversed and the circuit arrangement again operates as a selecting circuit. The code word with the not inhibited remaining code-digits and the newly investigated code-digits marks the information source with the code word, following next in value. Released by the signal at the output En of the counter Z, said code word can again be read from the storages Sp1, $Sp\overline{1}$ to Spm, $Sp\overline{m}$.

The function of the circuit arrangement according to FIG. 2 is thus continued, until, corresponding to the scanning method of the invention, all marked information sources have been considered.

If the alternating pulse application to the inputs T1, T2 is continued the marked information sources are comprehended automatically again.

FIG. 6 shows one of the switches S1, S2 to Sm. A transformer with the secondary output AU is equipped with two primary windings W1, W2 in the collector circuits of two transistors Tr1, Tr2. The first winding is in the same direction, the second winding in the opposite direction to the output winding. If the transistor Tr1 becomes conductive by a positive signal, applied to the input E1, a positive pulse on the pulse line Lp is transmitted as a positive impulse to the output Au.

If the transistor Tr2 becomes conductive by a positive signal on the input E2, a positive impulse on the pulse line Lp is transmitted as a negative impulse on the output Au.

FIG. 7 shows one of the switches $S\overline{1}$, $S\overline{2}$ to $S\overline{m}$. The circuit arrangement coincides with the one shown in FIG. 3, but, in addition, both inputs E1, E2 are coupled via two AND-circuits and via a negation-circuit. If an impulse is applied to input E2, but not to input E1, the transistor Tr2 becomes conductive, a positive impulse on the impulse line Lp appears at the output Au as a negative impulse.

If both inputs E1, E2 receive an impulse simultaneously, the transistor Tr1 becomes conductive and a positive impulse on the impulse line Lp is transmitted to the output Au as a positive impulse.

While the principles of the invention have been described above in connection with specific apparatus and applications, it is to be understood that this description is made only by way of example and not as a limitation on the scope of the invention.

I claim:

1. A scanning and selecting system for sequential investigation of all marked information sources out of a plurality of such information sources, said information sources having coded words associated therewith, first selecting means for selecting the marked information sources having the lowest valued code word, said first selecting means comprising first interrogation means for interrogating said marked information sources digit-by-digit, second selecting means for selecting the marked information source in a digit-by-digit interrogation in the opposite direction whereby the highest valued deviating code-digit of the marked information source with the next higher code word is investigated, a third selecting means analogous to the first selecting means operated responsive to the maintenance of the remaining code-digits of a higher value coinciding with the first investigated code word to investigate the lower valued code-digits belonging to the next following higher code word, and means for successively using said second and third selecting means to investigate all marked information sources.

2. The scanning and selecting arrangement of claim 1 wherein said first selecting means comprises lines that can be connected to said information sources, means for selectively code-digit marking said lines, said code-digit marking means including a group of magnetic elements, said lines inserted through said magnetic elements in coded arrangement to facilitate the code digit marking of said lines, said interrogating means comprising interrogating circuit means for interrogating and evaluating said lines to determine which of said lines is marked and to select one of the marked lines, reading loop means operated by said circuit means for transmitting the interrogating results, and blocking means for blocking lines excluded from selection by a preceding interrogation.

3. The circuit arrangement according to claim 2 wherein said blocking means comprises blocking windings individual to each of said magnetic elements.

4. The circuit arrangement according to claim 3, wherein the lines are inserted through the magnetic elements in a binary-coded distribution with the magnetic elements inserted in contradictory pairs per binary digit, means in said interrogating circuit means for actuating one of the magnetic elements per binary digit in the interrogating, as well as in the blocking direction, means in said interrogating circuit means for always actuating the other magnetic element per binary digit only in the blocking direction and logical switching means in said evaluating circuit operated responsive to the interrogating result of a code word binary digit for applying a blocking pulse alterntively to one of the two contradictory inserted magnetic elements per binary digit.

5. A circuit arrangement according to claim 2, wherein said magnetic elements are arranged in a 1-out-of-10 code, and wherein said interrogating circuit means comprises interrogating winding means for successively interrogating said elements on a marking of an input line, and means for providing blocking pulses, at the interrogation of further code-digits, except for the selected element which includes a marked input loop.

6. The arrangement of claim 5 including counter means, said counter means comprising a first input and a second input means in said counter causing said counter to forward and reverse count respectively, AND gate means connected to said inputs for operating said counter responsive to the coincidences of first and second input pulses to said AND gate means, pulse source means for periodically supplying said first input pulses, and flip-flop storage means for supplying said second input pulses.

7. The arrangement of claim 6 wherein said flip-flop storage means is operated responsive to the position of said counter and pulses on said interrogating winding means.

8. The circuit arrangement of claim 7 and switch means for connecting the output of said counter to said magnetic elements to set the lower valence magnetic element when said counter is pulsed forward and to set the higher valence magnetic element when said counter is pulsed back.

9. The circuit arrangement of claim 8 and means for blocking said elements that have been interrogated.

References Cited

UNITED STATES PATENTS

| | | | |
|---|---|---|---|
| 2,994,065 | 7/1961 | Thomas et al. | 340—172.5 |
| 2,994,066 | 7/1961 | Mendelson et al. | 340—172.5 |
| 3,249,923 | 5/1966 | Simshauser | 340—172.5 |
| 3,273,127 | 9/1966 | Armstrong | 340—172.5 |

PAUL J. HENON, *Primary Examiner.*

PAUL R. WOODS, *Assistant Examiner.*